United States Patent
Tsukuda et al.

(10) Patent No.: US 8,894,521 B2
(45) Date of Patent: Nov. 25, 2014

(54) POWER TRANSMISSION DEVICE AND VEHICLE IN WHICH POWER TRANSMISSION DEVICE IS INSTALLED

(75) Inventors: Kazumichi Tsukuda, Anjo (JP); Syoichi Sayo, Toyota (JP); Ryoji Habuchi, Toyota (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 731 days.

(21) Appl. No.: 12/588,005

(22) Filed: Sep. 30, 2009

(65) Prior Publication Data

US 2010/0099525 A1 Apr. 22, 2010

(30) Foreign Application Priority Data

Oct. 20, 2008 (JP) ................................ 2008-270056

(51) Int. Cl.
 *F16H 59/00* (2006.01)
 *F16H 61/00* (2006.01)
 *F16H 63/00* (2006.01)
 *F16H 61/662* (2006.01)

(52) U.S. Cl.
 CPC .............................. *F16H 61/66272* (2013.01)
 USPC .............................................. 474/28; 474/18

(58) Field of Classification Search
 USPC ....................................................... 474/18, 28
 See application file for complete search history.

(56) References Cited

U.S. PATENT DOCUMENTS

| | | | | |
|---|---|---|---|---|
| 4,458,318 A | * | 7/1984 | Smit et al. ........................ | 701/51 |
| 4,659,321 A | * | 4/1987 | Miyawaki ........................ | 474/28 |
| 4,747,807 A | * | 5/1988 | Nakamura et al. ............... | 474/28 |
| 4,747,808 A | * | 5/1988 | Moan ................................ | 474/28 |
| 4,761,153 A | * | 8/1988 | Morimoto ........................ | 474/28 |
| 4,846,765 A | * | 7/1989 | Sakai ................................ | 474/28 |
| 4,875,892 A | * | 10/1989 | Sueda ............................... | 474/17 |
| 5,009,129 A | * | 4/1991 | Morimoto et al. ............... | 477/49 |
| 5,612,873 A | | 3/1997 | Ogawa | |
| 5,720,691 A | * | 2/1998 | Ogawa et al. .................... | 477/45 |

(Continued)

FOREIGN PATENT DOCUMENTS

| | | |
|---|---|---|
| JP | A-60-53258 | 3/1985 |
| JP | A-2001-324006 | 11/2001 |
| JP | A-2002-181175 | 6/2002 |
| JP | A-2006-275276 | 10/2006 |

OTHER PUBLICATIONS

International Search Report mailed Dec. 28, 2009 in International Application No. PCT/JP2009/066888 (with translation).

(Continued)

*Primary Examiner* — Henry Liu
(74) *Attorney, Agent, or Firm* — Oliff PLC (57) ABSTRACT

A power transmission device includes a belt-type continuously variable transmission; a first fluid pressure cylinder; a second fluid pressure cylinder; a pressure-adjustment and pressure-feed device; a fluid outflow/inflow device; and a control unit that controls the pressure-adjustment and pressure-feed device based on a fluid pressure that is obtained from a thrust that is required for the second pulley in accordance with a driving state and that, by controlling the pressure-adjustment and pressure-feed device in this manner, controls the fluid outflow/inflow device such that a gear ratio is varied within a permitted gear ratio range in accordance with the fluid pressure that is pressure-fed from the pressure-adjustment and pressure-feed device in conjunction with the pressure adjustment.

4 Claims, 5 Drawing Sheets

(56) References Cited

U.S. PATENT DOCUMENTS

| | | | |
|---|---|---|---|
| 5,720,692 A * | 2/1998 | Kashiwabara | 477/45 |
| 6,099,424 A * | 8/2000 | Tsai et al. | 474/12 |
| 6,315,693 B1 * | 11/2001 | Tayama | 477/46 |
| 6,546,329 B2 * | 4/2003 | Bellinger | 701/115 |
| 6,612,958 B2 | 9/2003 | Imai et al. | |
| 6,813,551 B2 * | 11/2004 | Taniguchi et al. | 701/59 |
| 2001/0044686 A1 | 11/2001 | Taniguchi et al. | |
| 2003/0149520 A1 * | 8/2003 | Taniguchi et al. | 701/59 |

OTHER PUBLICATIONS

Apr. 2, 2013 Office Action issued in Chinese Patent Application No. 200980120328.4 (English translation only).

* cited by examiner

POWER TRANSMISSION DEVICE AND VEHICLE IN WHICH POWER TRANSMISSION DEVICE IS INSTALLED

INCORPORATION BY REFERENCE

The disclosure of Japanese Patent Application No. 2008-270056 filed on Oct. 30, 2008, including the specification, drawings and abstract is incorporated herein by reference in its entirety.

BACKGROUND

The present invention relates to a power transmission device and a vehicle in which the power transmission device is installed, the power transmission device including a belt-type continuously variable transmission that has a first pulley that is connected to an input shaft, a second pulley that is connected to an output shaft, and a belt that is passed around both of the pulleys, the belt-type continuously variable transmission also varying a groove width of the first pulley and a groove width of the second pulley such that power that is input to the input shaft is continuously varied and is output to the output shaft.

For some time, a type of vehicle has been proposed in which is installed a belt-type continuously variable transmission that is configured from a primary pulley that is connected to an input shaft, a secondary pulley that is connected to an output shaft, and a belt that is passed around both of the pulleys (for example, refer to Japanese Patent Application Publication No. JP-A-2002-181175). In the vehicle, a primary hydraulic actuator (a hydraulic cylinder) is used to vary a groove width of the primary pulley, and a secondary hydraulic actuator (a hydraulic cylinder) is used to vary a groove width of the secondary pulley, such that, by a varying of a radial distance of the belt, power that is input to the input shaft is continuously varied and is output to the output shaft.

SUMMARY

Incidentally, in the type of vehicle in which the belt-type continuously variable transmission that is described above is installed, a cancel chamber is provided in the hydraulic cylinder on the secondary side, and the cancel chamber cancels a centrifugal hydraulic pressure that acts on the hydraulic cylinder in conjunction with the rotation of the secondary shaft. Although the presence of this sort of cancel chamber makes it possible to perform regulation of the pressure in the hydraulic cylinder on the secondary side in a stable manner regardless of the revolution speed of the output shaft, it also increases the number of parts and leads to an enlarging of the device.

It is an object of a power transmission device according to the present invention and a vehicle in which the power transmission device is installed to fulfill the ordinary function of a transmission and also make the device more compact.

In order to achieve the object that is described above, the power transmission device according to the present invention and the vehicle in which the power transmission device is installed utilize means described below.

The power transmission device of the present invention is a power transmission device that is provided with a belt-type continuously variable transmission that includes a first pulley that is connected to an input shaft, a second pulley that is connected to an output shaft, and a belt that is passed around both of the pulleys, the belt-type continuously variable transmission continuously varying, by varying a groove width of the first pulley and a groove width of the second pulley, power that is input to the input shaft and outputting the power to the output shaft. The power transmission device includes a first fluid pressure cylinder that is capable of varying the groove width of the first pulley using fluid pressure; a second fluid pressure cylinder that is capable of varying the groove width of the second pulley using fluid pressure and that does not have a cancel chamber; a pressure-adjustment and pressure-feed device that supplies a working fluid to the first fluid pressure cylinder side and the second fluid pressure cylinder side in conjunction with pressure adjustment; a fluid outflow/inflow device that allows and cuts off an inflow of the working fluid to the first fluid pressure cylinder from the pressure-adjustment and pressure-feed device and that allows and cuts off a discharge of the working fluid from the first fluid pressure cylinder; and a control unit that controls the pressure-adjustment and pressure-feed device based on a fluid pressure that is obtained from a thrust that is required for the second pulley in accordance with a driving state and that, by controlling the pressure-adjustment and pressure-feed device in this manner, controls the fluid outflow/inflow device such that a gear ratio is varied within a permitted gear ratio range in accordance with the fluid pressure that is pressure-fed from the pressure-adjustment and pressure-feed device in conjunction with the pressure adjustment.

In the power transmission device of the present invention, the first pulley whose groove width can be varied using fluid pressure and the second pulley whose groove width can be varied using fluid pressure are provided, the pressure-adjustment and pressure-feed device that supplies the working fluid to the first fluid pressure cylinder side and the second fluid pressure cylinder side in conjunction with pressure adjustment is controlled based on the fluid pressure that is obtained from the fluid pressure that is required for the second pulley in accordance with a driving state, and because the pressure-adjustment and pressure-feed device is controlled in this manner, the fluid outflow/inflow device, which allows and cuts off the inflow of the working fluid to the first fluid pressure cylinder from the pressure-adjustment and pressure-feed device and which allows and cuts off the discharge of the working fluid from the first fluid pressure cylinder, is controlled such that the gear ratio is varied within the permitted gear ratio range in accordance with the fluid pressure that is discharged from the pressure-adjustment and pressure-feed device in conjunction with the pressure adjustment. This makes it possible to effectively utilize centrifugal pressure of the second pulley, so a pressure-adjustment and pressure-feed device with a comparatively small capacity can be used even as the power transmission device adequately demonstrates its function as a continuously variable transmission. The device can therefore be made more compact.

In the power transmission device of the present invention, it is possible for the control unit to be a unit that controls the fluid outflow/inflow device by using a map of a relationship of a lower limit revolution speed of the input shaft to the vehicle speed to set the lower limit revolution speed based on the vehicle speed, such that the gear ratio is varied within the range of the set lower limit revolution speed. In the power transmission device according to this aspect of the present invention, the map can also be generated such that the lower limit revolution speed is set in accordance with a first restriction when the vehicle speed is less than a specified vehicle speed, and the lower limit revolution speed is set in accordance with a second restriction when the vehicle speed is not less than the specified vehicle speed, the second restriction being such that the revolution speed of the input shaft becomes a higher revolution speed than when the first restriction is used. If this is done, shift control can be executed more appropriately, even if a pressure-adjustment and pressure-feed device with a comparatively small pressure-feed capacity is used. Here, the first restriction includes a restriction that prioritizes good fuel economy, a restriction that prioritizes protection of the continuously variable transmission and protection of the prime mover that is connected to the input shaft of the continuously variable transmission, a restriction that prioritizes driveability, and the like.

Further, the second restriction includes a restriction that is based on the revolution speed of the input shaft that can be achieved from the fluid pressure from the pressure adjustment and discharge device, as determined in accordance with the driving state, and the like.

The vehicle of the present invention is a vehicle in which is installed the power transmission device according to any one of the aspects of the present invention that are described above, that is, basically, a power transmission device that is provided with a belt-type continuously variable transmission that includes a first pulley that is connected to an input shaft, a second pulley that is connected to an output shaft, and a belt that is passed around both of the pulleys, the belt-type continuously variable transmission continuously varying, by varying a groove width of the first pulley and a groove width of the second pulley, power that is input to the input shaft and outputting the power to the output shaft. The power transmission device includes a first fluid pressure cylinder that is capable of varying the groove width of the first pulley using fluid pressure; a second fluid pressure cylinder that is capable of varying the groove width of the second pulley using fluid pressure and that does not have a cancel chamber; a pressure-adjustment and pressure-feed device that supplies a working fluid to the first fluid pressure cylinder side and the second fluid pressure cylinder side in conjunction with pressure adjustment; a fluid outflow/inflow device that allows and cuts off an inflow of the working fluid to the first fluid pressure cylinder from the pressure-adjustment and pressure-feed device and that allows and cuts off a discharge of the working fluid from the first fluid pressure cylinder; and a control unit that controls the pressure-adjustment and pressure-feed device based on a fluid pressure that is obtained from a thrust that is required for the second pulley in accordance with a driving state and that, by controlling the pressure-adjustment and pressure-feed device in this manner, controls the fluid outflow/inflow device such that a gear ratio is varied within a permitted gear ratio range in accordance with the fluid pressure that is discharged from the pressure-adjustment and pressure-feed device in conjunction with the pressure adjustment.

According to the vehicle of the present invention, because the power transmission device of the present invention is installed, the effects that the power transmission device of the present invention achieves, such as, for example, the effect of being able to use a pressure-adjustment and pressure-feed device with a comparatively small capacity even as the function as a continuously variable transmission is adequately demonstrated, the effect of being able to make the device more compact, and the like can be achieved.

DETAILED DESCRIPTION OF EMBODIMENTS

Figure 1:
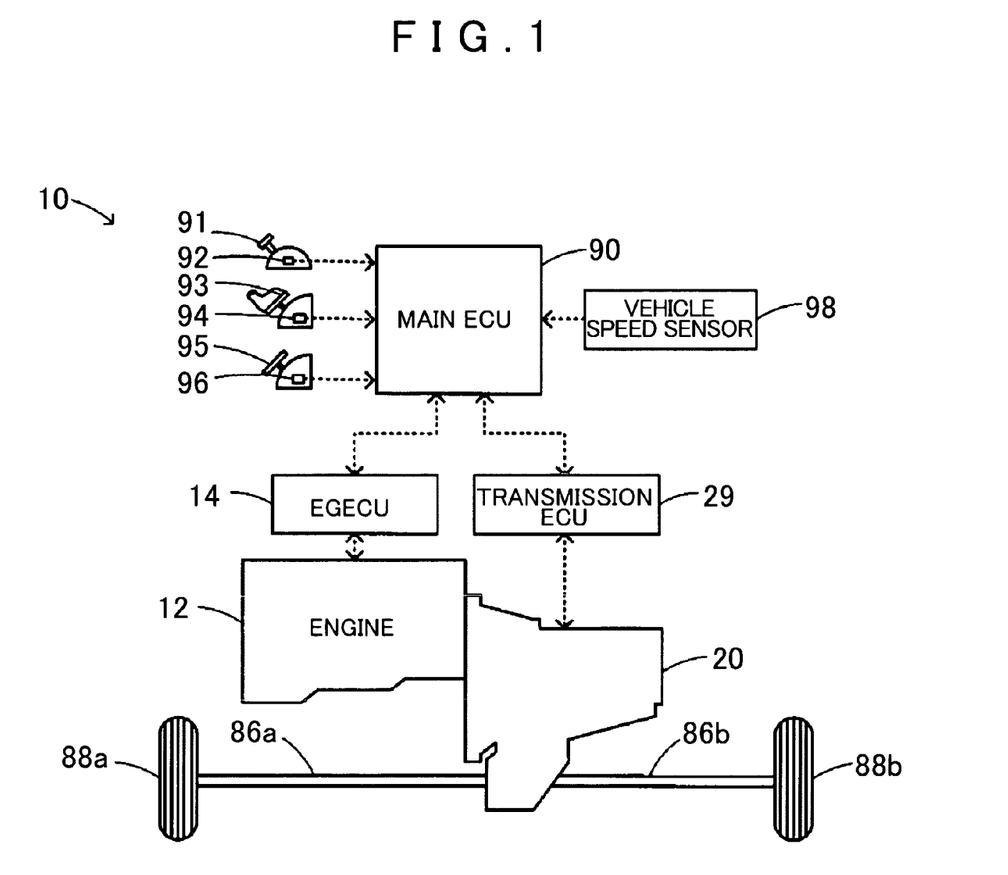
FIG. 1 is a configuration diagram that shows an overview of a configuration of an automobile 10 in which a power transmission device 20 is incorporated as an embodiment of the present invention.
Figure 2:
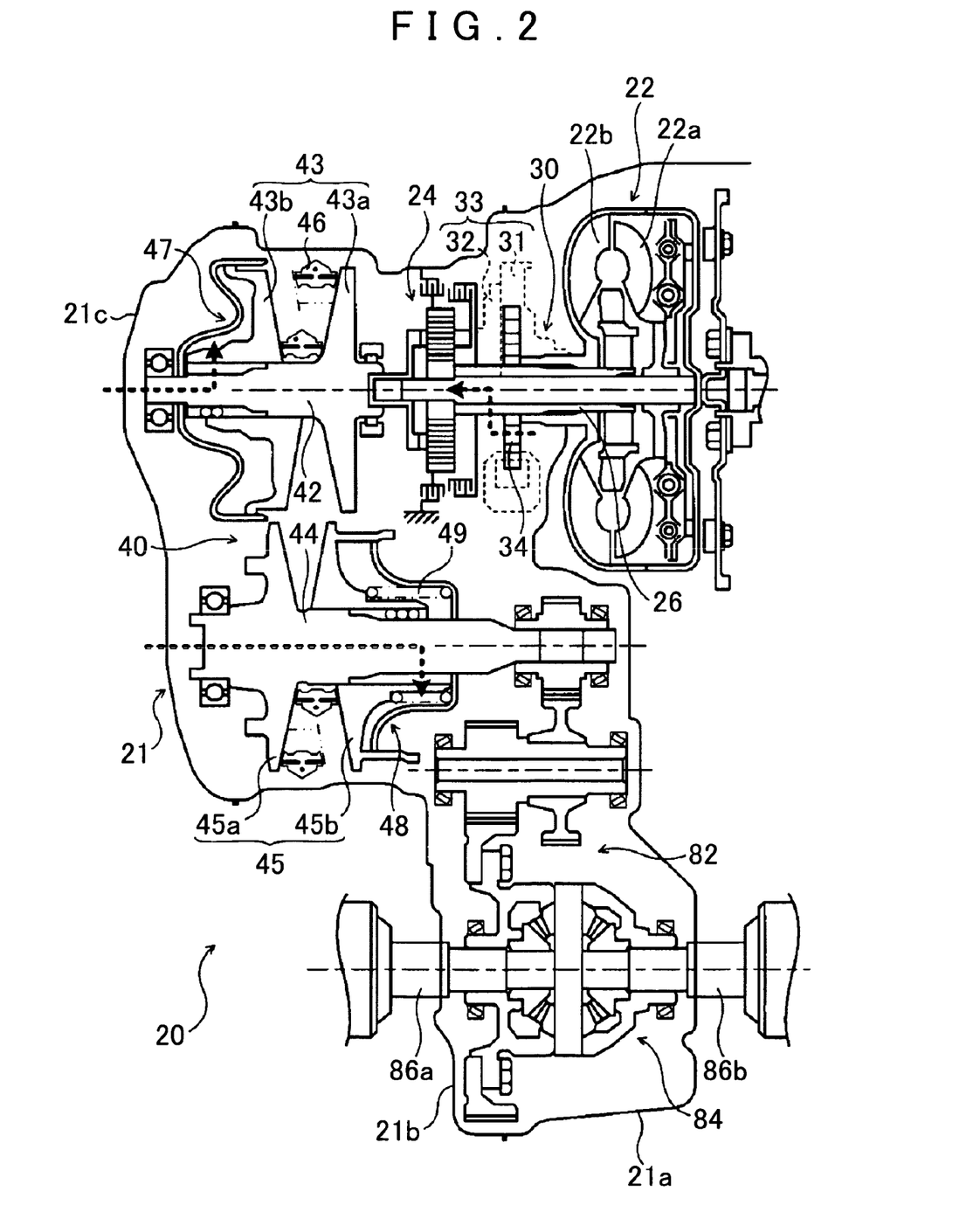
FIG. 2 is a configuration diagram that shows an overview of a configuration of the power transmission device 20 according to the embodiment.
Figure 3:
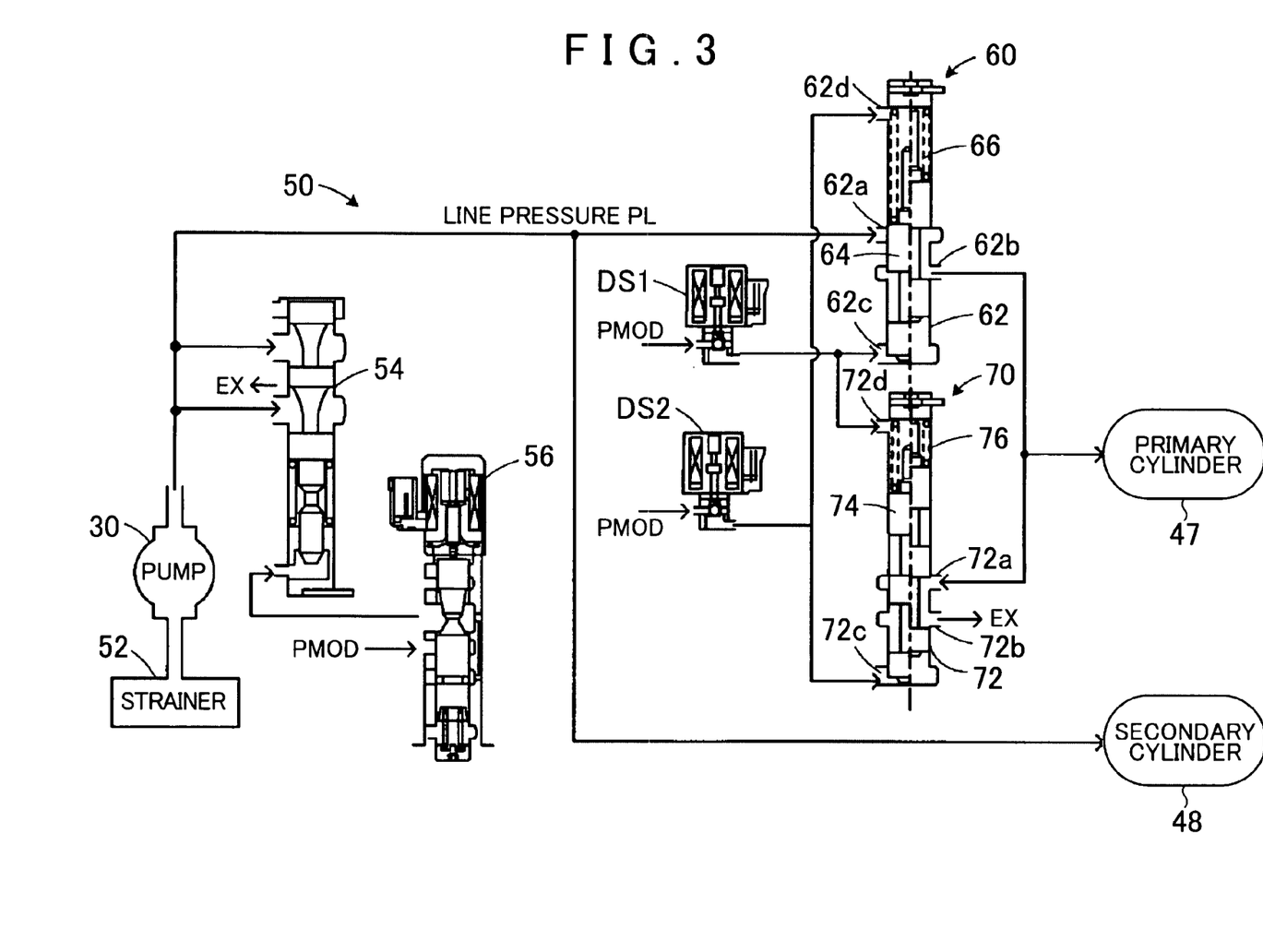
FIG. 3 is a configuration diagram that shows an overview of a configuration of a hydraulic circuit 50 that is included in the power transmission device 20 according to the embodiment.

FIG. 1 is a configuration diagram that shows an overview of a configuration of an automobile 10 in which a power transmission device 20 is incorporated as an embodiment of the present invention. FIG. 2 is a configuration diagram that shows an overview of a configuration of the power transmission device 20 according to the embodiment. FIG. 3 is a configuration diagram that shows an overview of a configuration of a hydraulic circuit 50 that is included in the power transmission device 20 according to the embodiment.

The automobile 10 in the embodiment, as shown in FIG. 1, is provided with an engine 12 that serves as an internal combustion engine that outputs power by explosive combustion of a hydrocarbon fuel such as gasoline or diesel oil, an engine electronic control unit (hereinafter called an engine ECU) 14 that controls the operation of the engine 12 by inputting signals from various types of sensors such as a revolution speed sensor that detects a revolution speed of a crankshaft of the engine 12, the power transmission device 20 in the embodiment, in which is incorporated a transmission that is attached to the crankshaft of the engine 12, and a main electronic control unit (hereinafter called a main ECU) 90 that controls the entire vehicle.

The power transmission device 20, as shown in FIG. 2, is configured as a transaxle device that transmits power to left and right wheels 88a, 88b from the engine 12, which is transversely arranged such that its crankshaft is roughly parallel to axles 86a, 86b. The power transmission device 20 is provided with a torque converter 22 that is connected to the crankshaft of the engine 12 and has a lock-up clutch that includes a pump impeller 22a on an input side and a turbine runner 22b on an output side; a forward/reverse switching mechanism 24 that is connected to the turbine runner 22b of the torque converter 22 and that outputs power that has been input as it switches between normal rotation and reverse rotation; an oil pump 30 that is disposed between the torque converter 22 and the forward/reverse switching mechanism 24; a continuously variable transmission (hereinafter called a CVT) 40 that has a primary shaft 42 that is connected to the forward/reverse switching mechanism 24 and a secondary shaft 44 that is disposed parallel to the primary shaft 42, the CVT 40 continuously shifting power that is input to the primary shaft 42 and outputting it to the secondary shaft 44; and a transmission electronic control unit (hereinafter called a transmission ECU) 29 that controls the CVT 40. These elements are accommodated in a case 21 that includes a converter housing 21a, a transaxle case 21b, and a rear cover 21c.

The oil pump 30, as shown in FIG. 2, is configured as a gear pump that is provided with a pump assembly 33 that includes a pump body 31 and a pump cover 32 and with an external tooth gear 34 that is connected to the pump impeller 22a through a hub. By using the power from the engine to rotate the external tooth gear 34, the oil pump 30 draws in a working fluid (an ATF) that has accumulated in an oil pan that is not shown in the drawings, thus generating a hydraulic pressure (a line pressure) that is required by the CVT 40 and the forward/reverse switching mechanism 24 and supplying the working fluid to lubricated portions such as bearings and the like.

The CVT 40, as shown in FIG. 2, includes a primary pulley 43 that is attached to the primary shaft 42; a secondary pulley 45 that is attached to the secondary shaft 44 that is arranged parallel to the primary shaft 42; a belt 46 that passes through a groove on the primary pulley 43 and a groove on the secondary pulley 45; a primary cylinder 47, which serves as a hydraulic actuator for varying the width of the groove on the primary pulley 43; and a secondary cylinder 48, which serves as a hydraulic actuator for varying the width of the groove on the secondary pulley 45. The power that is input to the primary shaft 42 is continuously varied by the varying of the groove widths of the primary pulley 43 and the secondary pulley 45 and is output to the secondary shaft 44. The secondary shaft 44 is coupled to the left and right axles 86a, 86b through a gear mechanism 82 and a differential gear 84, so the power from the engine 12 is transmitted to the axles 86a, 86b through the torque converter 22, the forward/reverse switching mechanism 24, the CVT 40, the gear mechanism 82 and the differential gear 84. Note that the primary pulley 43 is configured from a fixed sheave 43a that is formed as a single unit with the primary shaft 42 and a movable sheave 43b that is supported such that it can slide freely in the axial direction through a ball spline in the primary shaft 42, while the secondary pulley 45 is configured from a fixed sheave 45a that is formed as a single unit with the secondary shaft 44 and a movable sheave 45b that is supported such that it can slide freely in the axial direction through a ball spline in the secondary shaft 44 and a return spring 49.

In the CVT 40 in the embodiment, a cancel chamber is not provided on a rear surface of the secondary cylinder 48 in relation to the secondary pulley 45. Therefore, the rotation of the secondary shaft 44 causes a centrifugal hydraulic pressure to act on the secondary cylinder 48, but the reason for not providing the cancel chamber will be described later.

The CVT 40 is driven by a hydraulic circuit 50 that is shown in FIG. 3. The hydraulic circuit 50, as shown in FIG. 3, is provided with the previously described oil pump 30 that uses the power from the engine to take in and pressure-feed the working fluid from the oil pan through a strainer 52; a regulator valve 54 that regulates the pressure (a line pressure PL) of the working fluid that is pumped by the oil pump 30; a linear solenoid 56 that drives the regulator valve 54 by using a modulator pressure PMOD that is input from the line pressure PL through a modulator valve that is not shown in the drawings; a control valve 60 for supplying the line pressure PL to the primary cylinder 47 and for cutting off the supply to the primary cylinder 47; a duty solenoid valve DS1 that uses the modulator pressure PMOD to drive the control valve 60; a control valve 70 for draining the hydraulic pressure from within the primary cylinder 47 and for cutting off the draining from the primary cylinder 47; and a duty solenoid valve DS2 that uses the modulator pressure PMOD to drive the control valve 70. The hydraulic circuit 50 may also be configured such that the line pressure PL acts directly on the secondary cylinder 48.

The control valve 60 is configured from a sleeve 62 in which are formed an input port 62a that inputs the line pressure PL, an output port 62b that outputs the input line pressure PL to the primary cylinder 47, a signal pressure port 62c that inputs a signal pressure from the duty solenoid valve DS1, and a signal pressure port 62d that inputs a signal pressure from the duty solenoid valve DS2; a spool 64 that is disposed such that it can slide freely in the axial direction within the sleeve 62; and a spring 66 that energizes the spool 64 in the axial direction. When the duty solenoid valve DS1 is off, the spool 64 is moved by the energizing force of the spring 66 to a position in the left half portion shown in FIG. 3, closing a passage between the input port 62a and the output port 62b, and when the duty solenoid valve DS1 is on, the signal pressure that is input from the duty solenoid valve DS1 to the signal pressure port 62c overcomes the energizing force of the spring 66 and moves the spool 64 to a position in the right half portion shown in FIG. 3, opening the passage between the input port 62a and the output port 62b. In other words, when the duty solenoid valve DS1 is off, the supply of the line pressure PL to the primary cylinder 47 is cut off, and when the duty solenoid valve DS1 is on, the line pressure PL is supplied to the primary cylinder 47.

The control valve 70 is configured from a sleeve 72 in which are formed an input port 72a that inputs a primary pressure Pps of the primary cylinder 47, a drain port 72b that drains the input primary pressure Pps, a signal pressure port 72c that inputs the signal pressure from the duty solenoid valve DS2, and a signal pressure port 72d that inputs the signal pressure from the duty solenoid valve DS1; a spool 74 that is disposed such that it can slide freely in the axial direction within the sleeve 72; and a spring 76 that energizes the spool 74 in the axial direction. When the duty solenoid valve DS2 is off, the spool 74 is moved by the energizing force of the spring 76 to a position in the left half portion shown in FIG. 3, closing a passage between the input port 72a and the drain port 72b, and when the duty solenoid valve DS2 is on, the signal pressure that is input from the duty solenoid valve DS2 to the signal pressure port 72c overcomes the energizing force of the spring 76 and moves the spool 74 to a position in the right half portion shown in FIG. 3, opening the passage between the input port 72a and the drain port 72b. In other words, when the duty solenoid valve DS2 is off, the draining of the primary pressure Pps is cut off, and when the duty solenoid valve DS2 is on, the primary pressure Pps is drained. Note that in a state in which the duty solenoid valve DS1 is on and the duty solenoid valve DS2 is on, the supply of the line pressure PL to the primary cylinder 47 is cut off, and the draining of the primary pressure Pps is cut off.

The CVT 40 is controlled to be driven by the transmission ECU 29. Although details are not shown in the drawings, the transmission ECU 29 is configured as a microprocessor that is centered around a CPU, and in addition to the CPU, it is provided with a ROM that stores a processing program, a RAM that stores data temporarily, input and output ports, and a communication port. An input shaft revolution speed Nin from a revolution speed sensor that is attached to the primary shaft 42, which serves as an input shaft, an output shaft revolution speed Nout from a revolution speed sensor that is attached to the secondary shaft 44, which serves as an output shaft, and the like are input to the transmission ECU 29 through the input port, and a drive signal to the linear solenoid 56, drive signals to the duty solenoid valves DS1, DS2, and the like are output from the transmission ECU 29 through the output port. The transmission ECU 29 communicates with the main ECU 90, controls the CVT 40 (the hydraulic circuit 50)

according to a control signal from the main ECU 90, and, as necessary, outputs to the main ECU 90 data that pertain to the state of the CVT 40.

Although details are not shown in the drawings, the main ECU 90 is configured as a microprocessor that is centered around a CPU, and in addition to the CPU, it is provided with a ROM that stores a processing program, a RAM that stores data temporarily, input and output ports, and a communication port. A shift position SP from a shift position sensor 92 that detects an operating position of a shift lever 91, an accelerator angle Acc from an accelerator pedal position sensor 94 that detects an amount of depression of an accelerator pedal 93, a brake switch signal BSW from a brake switch 96 that detects an amount of depression of a brake pedal 95, a vehicle speed V from a vehicle speed sensor 98, and the like are input to the main ECU 90 through the input port. The main ECU 90 is connected to the engine ECU 14 and the transmission ECU 29 through the communication port and exchanges various types of controls signals and data with the engine ECU 14 and the transmission ECU 29.

Figure 4:
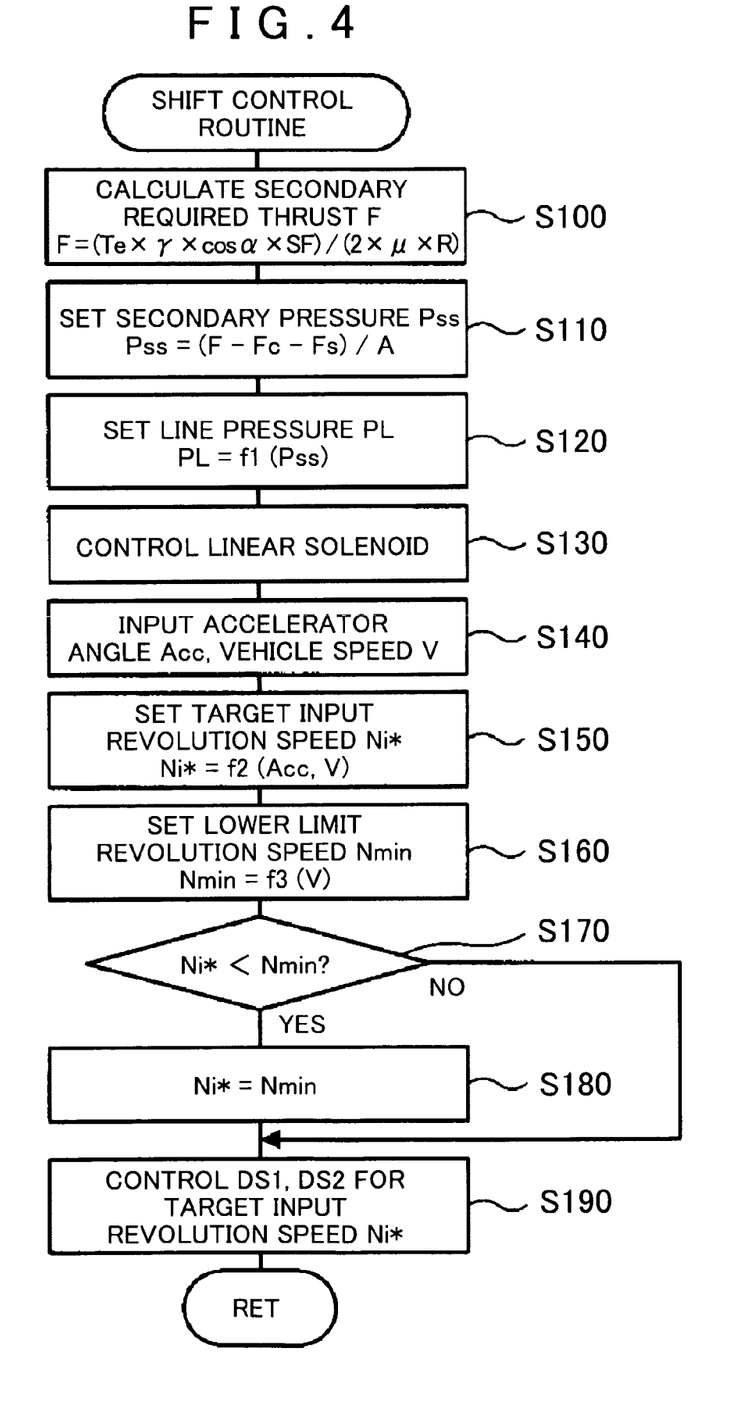
FIG. 4 is a flowchart that shows an example of a shift control routine that is executed by a transmission ECU 29 according to the embodiment.

Next, the operation of the power transmission device 20 according to the embodiment, which is configured as described above, will be explained. FIG. 4 is a flowchart that shows an example of a shift control routine that is executed by the transmission ECU 29 according to the embodiment. The routine is repeatedly executed at a specified time interval (for example, every several seconds).

When the shift control routine is executed, the CPU of the transmission ECU 29 first performs processing that calculates a secondary required thrust F (Step S100). Here, the secondary required thrust F is a force by which the secondary pulley 45 clamps the belt 46 in the axial direction of the secondary shaft 44, and it is calculated by equation (1), in which Te is the engine torque, γ is the current gear ratio of the CVT 40, α is an angle of inclination of surfaces that the belt 46 touches in the fixed sheave 45a and the movable sheave 45b of the secondary pulley 45, SF is a safety factor, μ is the coefficient of static friction between the belt 46 and the fixed sheave 45a and the movable sheave 45b, and R is the radius of rotation of the belt 46 in the secondary pulley 45.

$$F = (Te \times \gamma \times \cos \alpha \times SF)/(2 \times \mu \times R)$$

Once the secondary required thrust F has been calculated, the secondary pressure Pss is set based on the calculated secondary required thrust F (Step S110). Here, the secondary pressure Pss can be determined by equation (2), in which Fc is the thrust that is due to the centrifugal hydraulic pressure that is determined in accordance with the revolution speed (the output shaft revolution speed Nout) of the secondary shaft 44, Fs is the spring force of the return spring 49, and A is the piston surface area of secondary cylinder 48.

$$Pss = (F - Fc - Fs)/A$$

Once the secondary pressure Pss has been set, the line pressure PL is set such that the secondary pressure Pss is supplied to the secondary cylinder 48 (Step S120), and the regulator valve 54 is driven by controlling the linear solenoid 56 such that the set line pressure PL is achieved (Step S130). In this case, because the hydraulic circuit 50 in the embodiment is configured such that the line pressure PL is supplied directly to the secondary cylinder 48 (refer to FIG. 3), the line pressure PL can be set by adjusting the set secondary pressure Pss to take into account the loss within the hydraulic circuit 50, a small allowance, and the like. As described above, the cancel chamber is not provided in the secondary cylinder 48, so the centrifugal hydraulic pressure acts on the secondary cylinder 48. This means that the secondary pressure Pss that needs to act on the secondary cylinder 48 becomes less than it would be in a case where the cancel chamber is provided, and the line pressure PL can be reduced to that extent, so it is possible to reduce the capacity of the oil pump 30 and to make the oil pump 30 more compact. This is the reason why the cancel chamber is not provided in the secondary cylinder 48 in the present invention.

Figure 5:
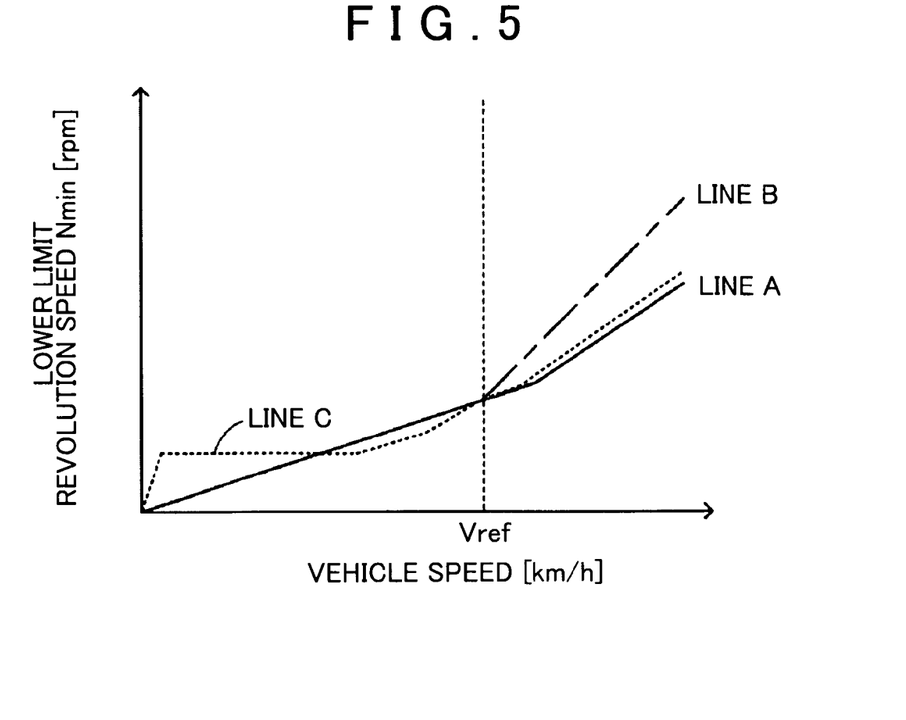
FIG. 5 is an explanatory figure that shows an example of a lower limit revolution speed setting map.

Next, data such as the accelerator angle Acc, the vehicle speed V, and the like are input (Step S140). The accelerator angle Acc and the vehicle speed V are data that are respectively detected by the accelerator pedal position sensor 94 and the vehicle speed sensor 98, and they are input through communication from the main ECU 90. Once the data have been input, a target input revolution speed Ni* is set as a target gear ratio of the CVT 40 (Step S150), using a shift map that is based on the accelerator angle Acc and the vehicle speed V and is stored in advance in the ROM, a lower limit revolution speed Nmin of the primary shaft 42 is set based on the vehicle speed V (Step S160), and when the set target input revolution speed Ni* is less than the lower limit revolution speed Nmin (Step S170), the target input revolution speed Ni* is reset to the lower limit revolution speed Nmin (Step S180). Here, the relationship between the vehicle speed V and the lower limit revolution speed Nmin is determined and stored in advance as a map in the ROM, and when the vehicle speed V is given, the lower limit revolution speed Nmin is determined by extracting the corresponding lower limit revolution speed Nmin from the map. An example of a lower limit revolution speed setting map is shown in FIG. 5. As shown in FIG. 5, when the vehicle speed V is less than a comparatively high specified vehicle speed Vref (for example, 80 km/h to 120 km/h), the lower limit revolution speed Nmin is set using an operation line A that is indicated by a solid line, and when the vehicle speed V is not less than the specified vehicle speed Vref, the lower limit revolution speed Nmin is set using an operation line B that is indicated by a broken line. Here, the operation line A is determined based on a restriction for achieving good fuel economy, and the operation line B is determined as a line where the lower limit revolution speed Nmin is shifted to a higher revolution speed than that of the operation line A. An operation line C that is indicated by a dotted line in FIG. 5 is determined based on a restriction for preserving the revolution speeds of the engine 12 and the CVT 40, a restriction for improving driveability, and the like, and when the vehicle speed V is equal to the specified vehicle speed Vref, the lower limit revolution speed Nmin is set to the higher of the revolution speed of the operation line A and the revolution speed of the operation line C. Note that it is obvious that a map that is different for each accelerator angle Acc may also be used as the lower limit revolution speed setting map.

Figure 6:
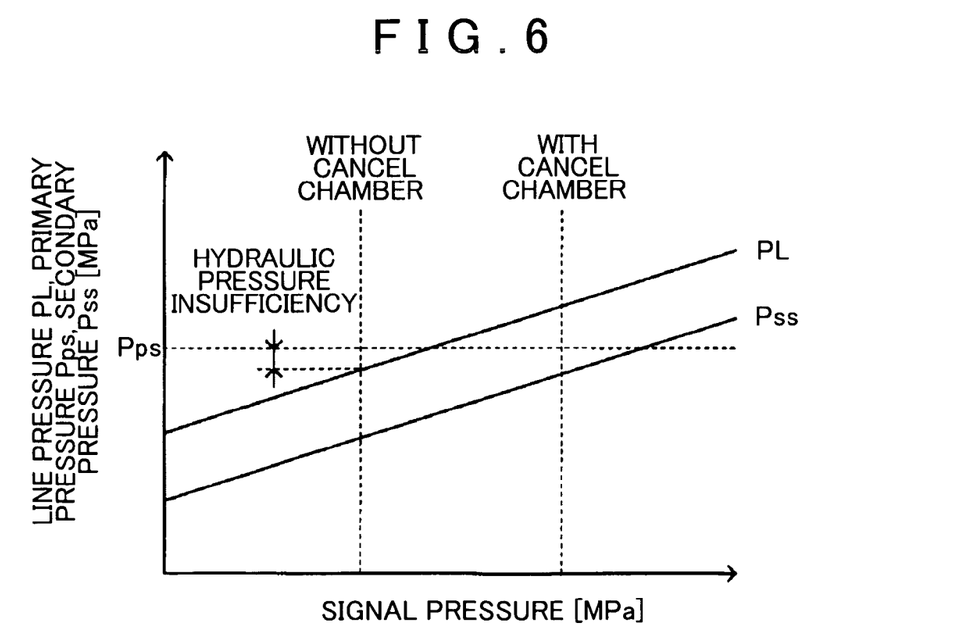
FIG. 6 is an explanatory figure that shows relationships between a signal pressure of a linear solenoid 56 and a line pressure PL, a primary pressure Pps, and a secondary pressure Pss in a case where a cancel chamber is provided in a secondary cylinder 48 and in a case where the cancel chamber is not provided.

FIG. 6 shows relationships between the signal pressure of the linear solenoid 56 and the line pressure PL, the primary pressure Pps, and the secondary pressure Pss in a case where the cancel chamber is provided in the secondary cylinder 48 and in a case where the cancel chamber is not provided. In a case like that described above, where the cancel chamber is not provided in the secondary cylinder 48, the centrifugal hydraulic pressure acts on the secondary cylinder 48 as the secondary shaft 44 rotates, so to the extent that the centrifugal hydraulic pressure acts, the required secondary pressure Pss becomes less than it would be in a case where the cancel chamber is provided in the secondary cylinder 48, and the line pressure PL is reduced, but in this case, the required primary pressure Pps becomes greater than the line pressure PL, due to the gear ratio that is required (the target input revolution speed Ni*), and cases occur in which the gear ratio that is required (the target input revolution speed Ni*) cannot be achieved due to inadequate hydraulic pressure. Therefore, in the embodiment, as shown in FIG. 5, when the vehicle speed V is less than the specified vehicle speed Vref, the lower limit revolution speed Nmin of the primary shaft 42 is set using the operation line A for achieving good fuel economy, but when the vehicle speed V is not less than the specified vehicle speed Vref, the lower limit revolution speed Nmin of the primary shaft 42 is set according to the operation line B, where the lower limit revolution speed Nmin is shifted to a higher revolution speed than that of the operation line A, such that a gear ratio is set that can be achieved using the line pressure PL that is set based on the secondary pressure Pss. The energy efficiency of the engine 12 is generally better when the engine 12 is operated at a high torque and a low revolution speed than when it is operated at a low torque and a high revolution speed, so when the engine 12 is operated with the lower limit revolution speed Nmin (the revolution speed of the engine 12) shifted to a higher revolution speed, the fuel economy becomes worse, but as described above, the line pressure PL can be reduced by eliminating the cancel chamber from the secondary cylinder 48, so to the extent that the energy efficiency is improved by being able to use a lower-capacity pump as the oil pump 30, the worsening of the fuel economy is offset, and there is no decrease in the energy efficiency of the vehicle as a whole.

Once the target input revolution speed Ni* has been set in this manner, the control valves 60, 70 are driven by controlling the duty solenoid valves DS1, DS2 such that the revolution speed of the primary shaft 42 becomes the target input revolution speed Ni* (Step S190), and the routine is terminated. In concrete terms, this processing becomes processing in which, when a current input revolution speed Ni is greater than the target input revolution speed Ni*, the duty solenoid valve DS1 is turned on and the duty solenoid valve DS2 is turned off, such that the passage between the input port 62a and the output port 62b of the control valve 60 is opened, and the passage between the input port 72a and the drain port 72b of the control valve 70 is closed, in order to increase the primary pressure Pps that acts on the primary cylinder 47. When the current input revolution speed Ni is less than the target input revolution speed Ni*, the duty solenoid valve DS1 is turned off and the duty solenoid valve DS2 is turned on, such that the passage between the input port 62a and the output port 62b of the control valve 60 is closed, and the passage between the input port 72a and the drain port 72b of the control valve 70 is opened, in order to decrease the primary pressure Pps that acts on the primary cylinder 47. When the current input revolution speed Ni is roughly equal to the target input revolution speed Ni*, the duty solenoid valves DS1, DS2 are both turned off, such that the passage between the input port 62a and the output port 62b of the control valve 60 is closed, and the passage between the input port 72a and the drain port 72b of the control valve 70 is closed, in order to maintain the primary pressure Pps that acts on the primary cylinder 47.

According to the power transmission device 20 in the embodiment that has been explained above, the cancel chamber is eliminated from the secondary cylinder 48 of the CVT 40, and the hydraulic circuit 50 is configured such that the line pressure PL acts directly on the secondary cylinder 48 and the line pressure PL flows into and out of the primary cylinder 47 through the control valves 60, 70, so the capacity of the oil pump 30 can be reduced by effectively utilizing the centrifugal hydraulic pressure. This makes it possible to make the device more compact. In addition, the CVT 40 (the hydraulic circuit 50) is controlled such that, when the vehicle speed V is less than the specified vehicle speed Vref, the lower limit revolution speed Nmin of the primary shaft 42 is set using the operation line A for achieving good fuel economy, with the gear ratio being varied within the range of the lower limit revolution speed Nmin, and when the vehicle speed V is not less than the specified vehicle speed Vref, the lower limit revolution speed Nmin of the primary shaft 42 is set according to the operation line B, where the lower limit revolution speed Nmin is shifted to a higher revolution speed than that of the operation line A, such that a gear ratio that lowers the revolution speed of the primary shaft 42 is selected from among the gear ratios that can be achieved using the line pressure PL that is set based on the secondary pressure Pss, and the gear ratio is varied within the range of the lower limit revolution speed Nmin, so the function of the CVT 40 as a transmission can be demonstrated even though the capacity of the oil pump 30 is reduced. At this time, the worsening of the fuel economy occurs, because the engine 12 is operated at a high revolution speed, but being able to reduce the capacity of the oil pump 30 makes it possible to improve the energy efficiency, so any reduction in the energy efficiency of the vehicle as a whole can be inhibited.

In the power transmission device 20 in the embodiment, the operation line A in FIG. 5 is determined by the restriction for achieving good fuel economy, but the operation line A is not limited to being determined by this restriction, and it may also be determined by another restriction.

In the power transmission device 20 in the embodiment, the transmission ECU 29 is configured from a single electronic control unit, but it may also be configured from at least two electronic control units.

In the embodiment, the present invention was explained in the form of the power transmission device 20 that is provided with the belt-type continuously variable transmission (the CVT 40), but the present invention may also take the form of a vehicle that is provided with the power transmission device 20 of the present invention.

Next, correspondence relationships between the main elements in the embodiment and the main elements of the present invention that is described in the "Summary" section will be explained. In the embodiment, the primary pulley 43 corresponds to a first pulley, the secondary pulley 45 corresponds to a second pulley, the primary cylinder 47 corresponds to a first fluid pressure cylinder, the secondary cylinder 48 corresponds to a second fluid pressure cylinder, the oil pump 30, the regulator valve 54, and the linear solenoid 56 correspond to a pressure adjustment and discharge device, the control valves 60, 70 and the duty solenoid valves DS1, DS2 correspond to a fluid outflow/inflow device, and the transmission ECU 29 that executes the shift control routine in FIG. 4 corresponds to control unit. Note that because the embodiment is only one example for explaining in concrete terms a preferred embodiment for practicing the present invention that is described in the "Summary" section, the correspondence relationships between the main elements in the embodiment and the main elements of the present invention that is described in the "Summary" section do not limit the elements of the present invention that is described in the "Summary" section. In other words, any interpretation of the present invention that is described in the "Summary" section should be based on that section, and the embodiment is nothing more than one concrete example of the present invention that is described in the "Summary" section.

A preferred embodiment for practicing the present invention has been explained above using the embodiment, but the present invention is not in any way limited by the embodiment that is described above, and various modifications may obviously be made within the scope of the present invention.

The present invention can be used in the automobile industry.

The invention claimed is:

1. A power transmission device comprising:
a belt-type continuously variable transmission that includes a first pulley that is connected to an input shaft, a second pulley that is connected to an output shaft, and a belt that is passed around both of the pulleys, the belt-type continuously variable transmission continuously varying, by varying a groove width of the first pulley and a groove width of the second pulley, power that is input to the input shaft and outputting the power to the output shaft;
a first fluid pressure cylinder that is capable of varying the groove width of the first pulley using fluid pressure;
a second fluid pressure cylinder that is capable of varying the groove width of the second pulley using fluid pressure and that does not have a cancel chamber;
a pressure-adjustment and pressure-feed device that supplies a working fluid to a first fluid pressure cylinder side and a second fluid pressure cylinder side in conjunction with pressure adjustment;
a fluid outflow/inflow device that allows and cuts off an inflow of the working fluid to the first fluid pressure cylinder from the pressure-adjustment and pressure-feed device and that allows and cuts off a discharge of the working fluid from the first fluid pressure cylinder; and
a control unit that controls the pressure-adjustment and pressure-feed device based on a fluid pressure that is obtained from a thrust that is required for the second pulley in accordance with a driving state and that, by controlling the pressure-adjustment and pressure-feed device in this manner, controls the fluid outflow/inflow device such that a gear ratio is varied within a permitted gear ratio range in accordance with the fluid pressure that is pressure-fed from the pressure-adjustment and pressure-feed device in conjunction with the pressure adjustment, wherein
the control unit is a unit that controls the fluid outflow/inflow device by using a map of a relationship of a lower limit threshold value of a revolution speed of the input shaft to the vehicle speed to set the lower limit threshold value of the revolution speed based on the vehicle speed, such that the gear ratio is varied within the range of the set lower limit threshold value of the revolution speed,
the map is generated such that the lower limit threshold value of the revolution speed is set in accordance with a first restriction when the vehicle speed is less than a specified vehicle speed, and the lower limit threshold value of the revolution speed is set in accordance with a second restriction when the vehicle speed is not less than the specified vehicle speed, the second restriction being such that the revolution speed of the input shaft becomes a higher revolution speed than when the first restriction is used at the same vehicle speed above the specified vehicle speed, and
a rate of change of the lower limit threshold value of the revolution speed as vehicle speed increases is greater when the second restriction is used than when the first restriction is used.

2. A vehicle in which the power transmission device according to claim 1 is installed.

3. The power transmission device according to claim 1, wherein the first restriction includes a restriction that prioritizes good fuel economy.

4. The power transmission device according to claim 1, wherein the second restriction includes a restriction that is based on a revolution speed of the input shaft that can be achieved from a fluid pressure that is pressure-adjusted.

* * * * *